US007718760B2

(12) United States Patent
Sasaki et al.

(10) Patent No.: US 7,718,760 B2
(45) Date of Patent: May 18, 2010

(54) π-CONJUGATED POLYMER AND MANUFACTURING METHOD THEREOF

(75) Inventors: Masaomi Sasaki, Susono (JP); Toshiya Sagisaka, Yokohama (JP); Masafumi Torii, Yokohama (JP); Takashi Okada, Yokohama (JP); Shinichi Kawamura, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 1104 days.

(21) Appl. No.: 11/372,120

(22) Filed: Mar. 10, 2006

(65) Prior Publication Data

US 2006/0247413 A1 Nov. 2, 2006

(30) Foreign Application Priority Data

Mar. 10, 2005 (JP) ............................. 2005-067842

(51) Int. Cl.
*C08G 75/06* (2006.01)
*C08G 75/00* (2006.01)
*C08G 73/00* (2006.01)

(52) U.S. Cl. .................. 528/377; 528/422; 528/242; 528/245; 528/398; 528/489

(58) Field of Classification Search .............. 528/245, 528/398, 489, 377, 422, 242
See application file for complete search history.

(56) References Cited

U.S. PATENT DOCUMENTS

| 5,777,070 A | 7/1998 | Inbasekaran et al. |
| 2004/0212042 A1 | 10/2004 | Sagisaka et al. |

FOREIGN PATENT DOCUMENTS

| JP | 6-166743 | 6/1994 |
| JP | 8-157575 | 6/1996 |
| JP | 10-310635 | 11/1998 |
| JP | 2000-344873 | 12/2000 |
| JP | 2002-515078 | 5/2002 |
| WO | WO 97/09394 | 3/1997 |

OTHER PUBLICATIONS

Ding et al; Structure—conjugated polymers; Macromolecules (2004), 37(26), 10031-10035; American Chemical Society, Chem Abstract 142: 177436.*
Egbe et al; Supramolecular—poly(phenylene-vinylene)s; Macromolecules (2004), 37(20), 7451-7463: American Chemical Society; Chem Abstract 141: 395904.*
Tong et al; Photoexcitation—PPE-PPV copolymer; Physical—materials physics (2004), 69(15), 1555211/8; american physical society; Chem Abstract 141:124485.*
U.S. Appl. No. 11/682,641, filed Mar. 6, 2007, Sasaki, et al.

* cited by examiner

*Primary Examiner*—Duc Truong
(74) *Attorney, Agent, or Firm*—Oblon, Spivak, McClelland, Maier & Neustadt, L.L.P.

(57) ABSTRACT

The present invention provides a π-conjugated polymer containing a repeating unit expressed by the following General Formula (I):

General Formula (I)

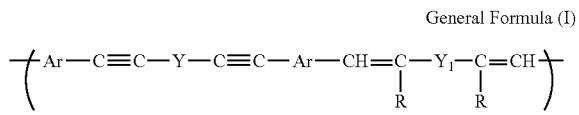

where, in the General Formula (I), Y and Ar represent one of a substituted or unsubstituted aromatic hydrocarbon and a substituted or unsubstituted divalent group of aromatic heterocyclic ring, $Y_1$ represents one of a substituted or unsubstituted unsaturated aliphatic hydrocarbon, a substituted or unsubstituted aromatic hydrocarbon and a substituted or unsubstituted divalent group of aromatic heterocyclic ring and R represents one of a hydrogen atom, a substituted or unsubstituted alkyl group and a substituted or unsubstituted aromatic hydrocarbon group.

7 Claims, 9 Drawing Sheets

US 7,718,760 B2

π-CONJUGATED POLYMER AND MANUFACTURING METHOD THEREOF

BACKGROUND OF THE INVENTION

1. Field of the Invention

The present invention relates to a new π-conjugated polymer useful as a material for organic electronics such as photoelectric conversion elements, FET elements and light-emitting elements and a manufacturing method of the π-conjugated polymer.

2. Description of the Related Art

Since π-conjugated polymers have π-electron system extended one-dimensionally along the main chains, they exhibit unique electronic and optical features. The most typical examples are conductive polymers; however, applications of these π-conjugated polymers are actively spread not only for use as a conductive material but also to various function elements such as photoelectric conversion elements, FET elements and light-emitting elements in recent years. The organic polymers are used because of low production cost, sufficient flexibility, strength and lightweight, capability of having larger dimension and possibility of a broad range of designs on the molecular level.

Typical examples of π-conjugated polymer include polyacetylene, poly-p-phenylene, polythiophene, polyallylenevinylene, and the like. Because of diverseness of molecular designs in recent years, various π-conjugated polymers are being examined aiming for more sophisticated elements. Many proposals have been made, for example, poly(alkyl) thiophene (Appl. Phys. Lett., 69 4108 (1996)) and polymers having fluorene structure as a basic structural unit (U.S. Pat. No. 5,777,070). In particular, π-conjugated polymers in U.S. Pat. No. 5,777,070 are actively applied to FET elements.

Furthermore, polymer materials having alylamine unit as a repeating unit are also being examined (Japanese Patent Application Laid-Open (JP-A) Nos. 10-310635, 08-157575, 2002-515078, International Publication No. WO97/09394, Synth. Met., 84 269 (1997)).

And polymers having carbon-carbon triple bond are being examined energetically (JP-A Nos. 06-166743, 2000-344873, Macromol. Chem. Phys. 202 2572 (2001), Chem. Rev. 100 605 (2000)).

The mobility, a typical parameter of the materials for organic electronics, of the polymer materials in these related arts has been improved remarkably. However, polymers of higher mobility are still desired considering the application to organic FET elements as materials for organic electronics.

In order to utilize the most important features such as low production cost, sufficient flexibility and strength, lightweight and capability of having larger dimension as an element using organic materials, a sufficient solubility in organic solvent is needed. Generally, the structure of π-conjugated polymers in which conjugation is stretched is often rigid, and this lead to lowering of solubility. Therefore in the current situation, many polymer materials in above related arts are not satisfactory in terms of solubility and various molecular designs are being examined to avoid this problem.

SUMMARY OF THE INVENTION

It is an object of the present invention to provide a π-conjugated polymer useful as a polymer material for organic electronics such as photoelectric conversion elements, FET elements and light-emitting elements which exhibit excellent mobility and are adaptable to low-cost processes, and a manufacturing method of the π-conjugated polymer.

The π-conjugated polymer according to the present invention contains a repeating unit expressed by the following General Formula (I):

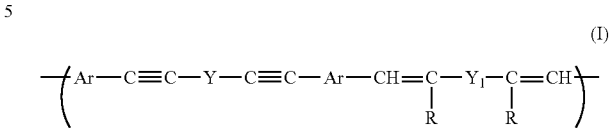

General Formula (I)

where, in the General Formula (I), Y and Ar represent one of a substituted or unsubstituted aromatic hydrocarbon and a substituted or unsubstituted divalent group of aromatic heterocyclic ring, $Y_1$ represents one of a substituted or unsubstituted unsaturated aliphatic hydrocarbon, a substituted or unsubstituted aromatic hydrocarbon and a substituted or unsubstituted divalent group of aromatic heterocyclic ring and R represents one of a hydrogen atom, a substituted or unsubstituted alkyl group and a substituted or unsubstituted aromatic hydrocarbon group.

The manufacturing method of a π-conjugated polymer according to the present invention includes a polymerization reaction between a dialdehyde compound and a diphosphonate ester compound, wherein the dialdehyde compound is expressed by the following General Formula (V):

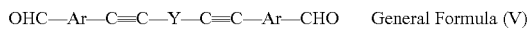

where, in the General Formula (V), Y and Ar represent one of a substituted or unsubstituted aromatic hydrocarbon and a substituted or unsubstituted divalent group of aromatic heterocyclic ring, and the diphosphonate ester compound is expressed by the following General Formula (VI):

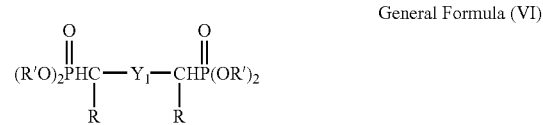

General Formula (VI)

where, in the General Formula (VI), $Y_1$ represents one of a substituted or unsubstituted unsaturated aliphatic hydrocarbon, a substituted or unsubstituted aromatic hydrocarbon and a substituted or unsubstituted divalent group of aromatic heterocyclic ring, R represents one of a hydrogen atom, a substituted or unsubstituted alkyl group and a substituted or unsubstituted aromatic hydrocarbon group and R' represents an alkyl group.

DESCRIPTION OF THE PREFERRED EMBODIMENTS

π-Conjugated Polymer and Manufacturing Method Thereof

Figure 1:
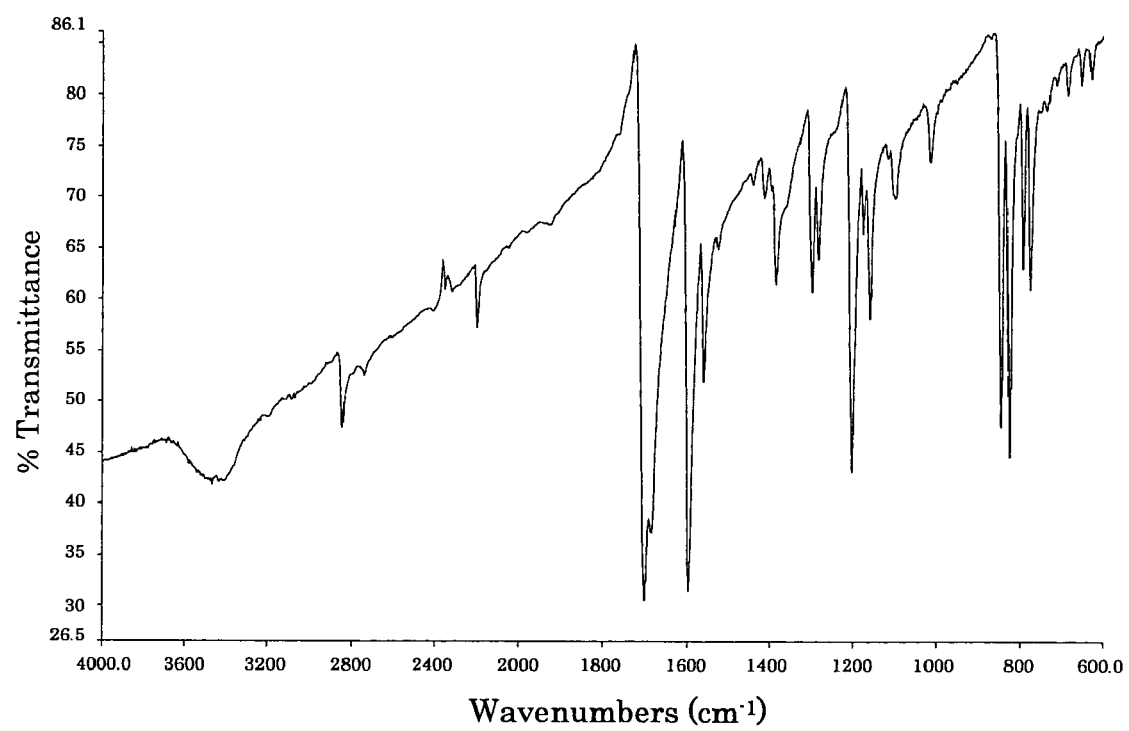
FIG. 1 is a view showing an infrared absorption spectrum (KBr method) of a dialdehyde compound obtained in Synthetic Example 1.

The π-conjugated polymer according to the present invention contains a repeating unit expressed by the following General Formula (I):

General Formula (I)

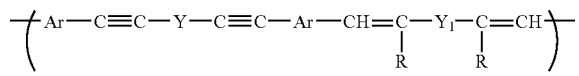

where, in the General Formula (I), Y and Ar represent one of a substituted or unsubstituted aromatic hydrocarbon and a substituted or unsubstituted divalent group of aromatic heterocyclic ring, $Y_1$ represents one of a substituted or unsubstituted unsaturated aliphatic hydrocarbon, a substituted or unsubstituted aromatic hydrocarbon and a substituted or unsubstituted divalent group of aromatic heterocyclic ring and R represents one of a hydrogen atom, a substituted or unsubstituted alkyl group and a substituted or unsubstituted aromatic hydrocarbon group.

The π-conjugated polymer is preferably containing a repeating unit expressed by the following General Formula (II):

—(Ar—C≡C—Y—C≡C—Ar—CH=CH—Y₁—
CH=CH)—         General Formula (II)

where, in the General Formula (II), Y and Ar represent one of a substituted or unsubstituted aromatic hydrocarbon and a substituted or unsubstituted divalent group of aromatic heterocyclic ring and $Y_1$ represents one of a substituted or unsubstituted unsaturated aliphatic hydrocarbon, a substituted or unsubstituted aromatic hydrocarbon and a substituted or unsubstituted divalent group of aromatic heterocyclic ring.

The π-conjugated polymer is preferably containing a repeating unit expressed by the following General Formula (III):

General Formula (III)

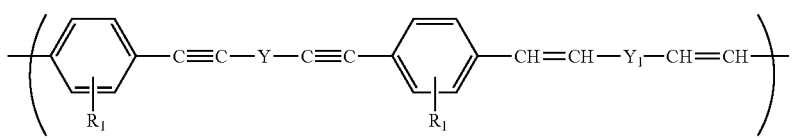

where, in the General Formula (III), Y represents one of a substituted or unsubstituted aromatic hydrocarbon and a substituted or unsubstituted divalent group of aromatic heterocyclic ring, $Y_1$ represents one of a substituted or unsubstituted unsaturated aliphatic hydrocarbon, a substituted or unsubstituted aromatic hydrocarbon and a substituted or unsubstituted divalent group of aromatic heterocyclic ring and $R_1$ represents one of a hydrogen atom, a substituted or unsubstituted alkyl group and a substituted or unsubstituted alkoxy group.

The π-conjugated polymer is preferably containing a repeating unit expressed by the following General Formula (IV):

General Formula (IV)

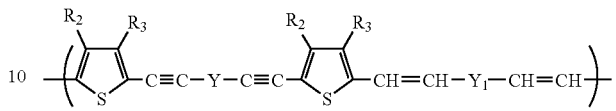

where, in the General Formula (IV), Y represents one of a substituted or unsubstituted aromatic hydrocarbon and a substituted or unsubstituted divalent group of aromatic heterocyclic ring and $Y_1$ represents one of a substituted or unsubstituted unsaturated aliphatic hydrocarbon, a substituted or unsubstituted aromatic hydrocarbon and a substituted or unsubstituted divalent group of aromatic heterocyclic ring. Each $R_2$ and $R_3$ represents one of a hydrogen atom and a substituted or unsubstituted alkyl group and they may be homogeneous or heterogeneous to each other.

The π-conjugated polymer containing a repeating unit expressed by the above General Formula (I) is produced from Wittig-Horner reaction using aldehyde and phosphonate, Wittig reaction using aldehyde and phosphonium salt, Heck reaction using vinyl substitution and halogen compound and the like, for example, and Wittig-Horner reaction and Wittig reaction are especially effective for their simple reaction operations. Furthermore, the Wittig-Horner reaction in which trans elimination precedes is more preferable in terms of stereoselectivity.

The manufacturing method of the π-conjugated polymer of the present invention using Wittig-Horner reaction will be explained below.

The π-conjugated polymer containing a repeating unit expressed by the above General Formula (I) is produced by adding a base which is two times or more of the solution in terms of molar weight into a solution in which dialdehyde compound expressed by the following General Formula (V) and diphosphonate ester compound expressed by the following General Formula (VI) are dissolved in a way such that they are stoichiometrically equivalent.

OHC—Ar—C≡C—Y—C≡C—Ar—CHO     General Formula (V)

In the General Formula (V), Y and Ar represent one of a substituted or unsubstituted aromatic hydrocarbon and a substituted or unsubstituted divalent group of aromatic heterocyclic ring.

General Formula (VI)

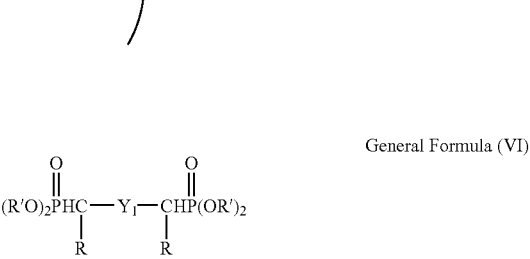

In the General Formula (VI), $Y_1$ represents one of a substituted or unsubstituted unsaturated aliphatic hydrocarbon, a substituted or unsubstituted aromatic hydrocarbon and a substituted or unsubstituted divalent group of aromatic heterocyclic ring, R represents one of a hydrogen atom, a substituted or unsubstituted alkyl group and a substituted or unsubstituted aromatic hydrocarbon group and R' represents an alkyl group.

The dialdehyde compound expressed by the above General Formula (V) is a new compound and it is obtained from cross coupling reaction using palladium catalyst which was proposed separately by the present inventors, for example.

The synthetic reaction will be described below.

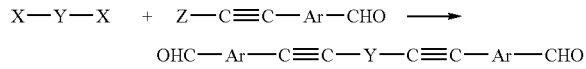

In the above equation, X represents a halogen atom and Z represents a hydrogen atom or trimethylsilyl group. Y and Ar represent one of a substituted or unsubstituted aromatic hydrocarbon and a substituted or unsubstituted divalent group of aromatic heterocyclic rings.

The diphosphonate ester compound expressed by General Formula (VI) is obtainable from known various reactions and it is easily obtainable from Michaelis-Arbuzov reaction, a reaction between halomethyl compound and trialkyl phosphite.

The Wittig-Horner reaction will be explained in more detail.

The base used for the above polymerization reaction is not particularly limited as long as it is capable of forming phosphbnate carbanion and examples include metal alkoxide compounds, metal hydrido compounds and organolithium compounds. Examples of such compounds include potassium t-butoxide, sodium t-butoxide, lithium t-butoxide, potassium 2-methyl-2-butoxide, sodium 2-methyl-2-butoxide, sodium methoxide, sodium ethoxide, potassium ethoxide, potassium methoxide, sodium hydride, potassium hydride, methyllithium, ethyllithium, propyllithium, n-butyllithium, s-butyllithium, t-butyllithium, phenyllithium, naphthyllithium, lithiumamide, lithium diisopropylamide and the like.

The base amount normally used for reaction is equivalent to the polymerization active site of phosphonate ester compounds and it also poses no problem if an excessive base amount is used.

The base may be added to a reaction system in a state of solid or suspension liquid and it is preferably added as a homogeneous solution in particular for an appropriate homogeneity of the obtained polymers. A solvent which forms a stable solution with the base must be selected as a solvent dissolving the base and other preferability include high solubility in the base, ability to retain solubility of high-molecular-weight body generated in the reaction system in a reaction solvent and ability to appropriately dissolve the high-molecular-weight body. The solvent can be selected accordingly from known alcohol-based, ether-based, amine-based and hydrocarbon-based solvents corresponding to the utilized base and the property of produced high-molecular-weight body.

Examples of combination between base and solvents which dissolves the base uniformly include solutions of various combinations, for example, methanol solution of sodium methoxide, ethanol solution of sodium ethoxide, 2-propanol solution of potassium t-butoxide, 2-methyl-2-propanol solution of potassium t-butoxide, tetrahydrofran solution of potassium t-butoxide, dioxane solution of potassium t-butoxide, hexane solution of n-butyllithium, ether solution of methyllithium, tetrahydrofran solution of lithium t-butoxide, cyclohexane solution of lithium diisopropylamide, toluene solution of potassium bis(trimethylsilyl)amide and the like and some of them are commercially available. It is preferably a metal alkoxide solution for easiness of handling and more preferably an ether solution of metal t-butoxide in terms of solubility of generated polymers, easiness of handling and reaction efficiency and most preferably a tetrahydrofran solution of potassium t-butoxide.

The polymerization time for the above polymerization reaction may be set corresponding to reactivity of used monomers or molecular weight of desired polymers and it is preferably 0.2 hour to 30 hours.

There is no need to control the reaction temperature in the above polymerization reaction and the polymerization reaction progresses appropriately at a room temperature. It is also possible to heat the reaction solution to improve reaction efficiency or to cool the reaction solution to create more mild condition.

It is also possible to add molecular-weight regulators for regulating molecular weight in polymerization operation or sealants for sealing ends of polymers as end-modified groups to the reaction system and they may be added at the start of the reaction. Consequently, groups based on stoppers may be bonded with terminal portion of the π-conjugated polymer of the present invention.

Examples of molecular-weight regulators and terminal sealants include benzylphosphonic acid diethyl, benzaldehyde and compounds having one reaction activating group.

The polystyrene equivalent number molecular weight of the polymer of the present invention is preferably 1,000 to 1,000,000 and more preferably 2,000 to 500,000. When the molecular weight is too small, film forming performance is deteriorated because of occurrence of cracks, etc. leading to little practicability. When the molecular weight is too large, solubility in general organic solvents is deteriorated, coating becomes difficult because of increased viscosity of the solution thereby posing a problem for practical use.

Furthermore, it is possible to add a small amount of branching agent during polymerization in order to improve mechanical properties. Compounds having 3 or more of heterogeneous or homogeneous polymerization reaction activating groups are used as branching agent. These branching agents can be used alone or in combination.

The π-conjugated polymer obtained as above is used after removal of the base used for polymerization, unreacted monomers, and terminal stoppers or impurities such as inorganic salt generated during polymerization. These purification operations may be performed using known methods such as reprecipitation, extraction, Soxhlet's extraction, ultrafiltration and dialysis.

The polymer of the present invention obtained from the above manufacturing method is capable of producing an appropriate layer which has no cracks and excels in strength, flexibility and durability by means of known methods such as spincoating, casting, dipping, inkjet, doctor blade, screen printing and spray coating. The polymer of the present invention may be preferably used as a polymer material for organic electronics such as photoelectric conversion elements, FET elements and light-emitting elements.

The π-conjugated polymer containing a repeating unit expressed by General Formula (I) obtained as above will be explained specifically.

In the above General Formula (I), the divalent group of substituted or unsubstituted unsaturated aliphatic hydrocarbon represented by $Y_1$ include —CH═CH— and —CH═CH—CH═CH—.

Moreover, in the above General Formula (I), when Y, $Y_1$ and Ar represent a substituted or unsubstituted aromatic hydrocarbon or a substituted or unsubstituted divalent group of aromatic heterocyclic ring, the following examples are included.

Examples are divalent groups of benzene, naphthalene, biphenyl, terphenyl, pyrene, fluorene, 9,9-dimethylfluorene, azulene, anthracene, triphenylene, chrysene, 9-benzylidene-fluorene, 5H-dibenzo[a,d]cycloheptene, triphenylamine, thiophene, benzothiophene, dithienylbenzene, fran, benzofran and carbazole and these may have substituted groups such as substituted or unsubstituted alkyl groups and alkoxy groups.

The substituted or unsubstituted alkyl group may be linear, branched or circular alkyl groups having carbon number 1 to 25, for example. These alkyl groups may contain a phenyl group which is further substituted with fluorine atom, cyano group, phenyl group, halogen atom or linear or branched alkyl group. Specific examples include methyl group, ethyl group, n-propyl group, i-propyl group, t-butyl group, s-butyl group, n-butyl group, i-butyl group, pentyl group, hexyl group, heptyl group, octyl group, nonyl group, decyl group, dodecyl group, 3,7-dimethyloctyl group, 2-ethylhexyl group, trifluoromethyl group, 2-cyanoethyl group, benzyl group, 4-chlorobenzyl group, 4-methylbenzyl group, cyclopentyl group and cyclohexyl group.

Specific examples of substituted or unsubstituted alkoxy group include an alkoxy group produced by inserting oxygen atom in binding position of the above alkyl group.

Examples of other substituted groups include halogen atom, trifluoromethyl group, cyano group, nitro group, alkylthio group, alylthio group, alkyl-substituted amino group and acyl group.

Specific examples of alkylthio group and alylthio group include methylthio group, ethylthio group, phenylthio group and p-methylphenylthio group. Specific examples of alkyl-substituted amino group include diethylamino group, N-methyl-N-phenylamino group, N,N-diphenylamino group, N,N-di(p-tolyl)amino group, dibenzylamino group, piperidino group, morpholino group and julolidyl group. Specific examples of acyl group include acetyl group, propionyl group, butyryl group, malonyl group and benzoyl group.

When R in the General Formula (I) represents a substituted or unsubstituted aromatic hydrocarbon group, specific examples of R include a monovalent group of above aromatic hydrocarbon groups.

When R and R' in the General Formulae (I) and (VI), $R_1$ in the General Formula (III) and $R_2$ and $R_3$ in the General Formula (IV) represent substituted or unsubstituted alkyl groups, the definition is the same with that of the substituted or unsubstituted alkyl groups in the above substituted or unsubstituted aromatic hydrocarbon or aromatic heterocyclic ring. Moreover, when $R_1$ in the General Formula (III) represents an alkoxy group, the definition is the same with that of the substituted or unsubstituted alkoxy groups in the above substituted or unsubstituted aromatic hydrocarbon or aromatic heterocyclic ring.

The followings are preferred specific examples of dihalogen compounds, the raw materials of dialdehyde compound expressed by the above General Formula (V).

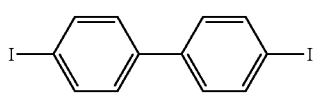

V-1

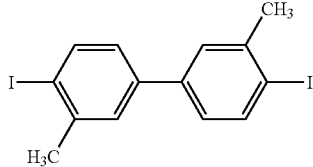

V-2

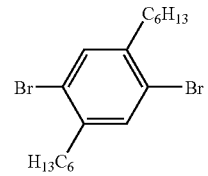

V-3

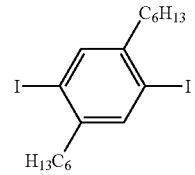

V-4

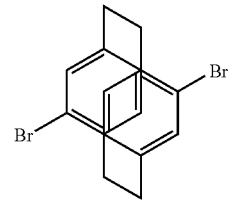

V-5

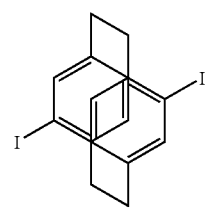

V-6

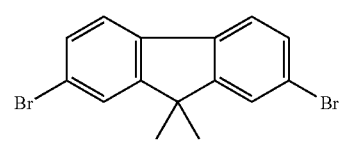

V-7

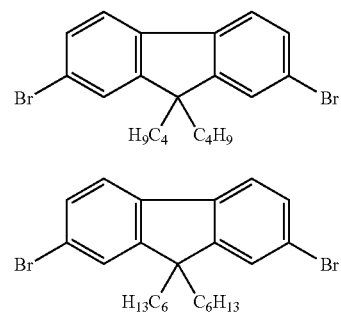

V-8

V-9

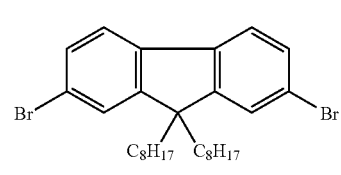

V-10

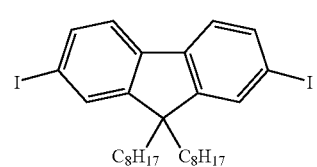

V-11

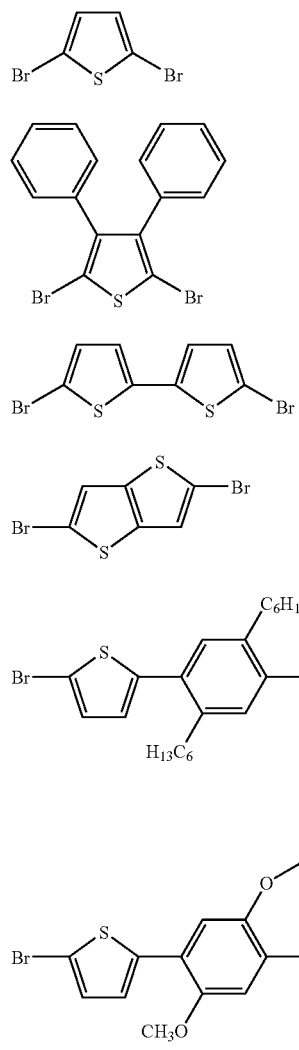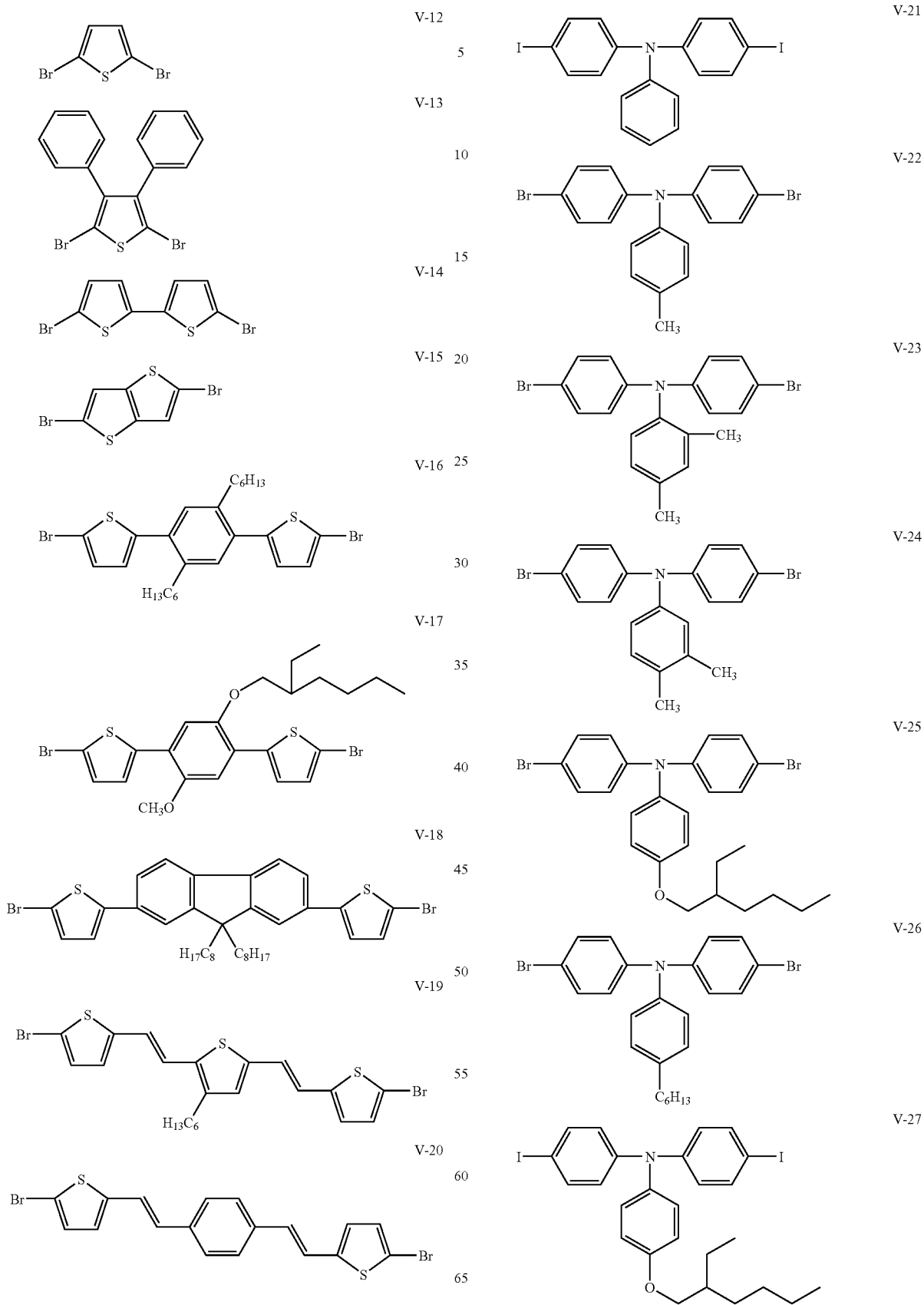

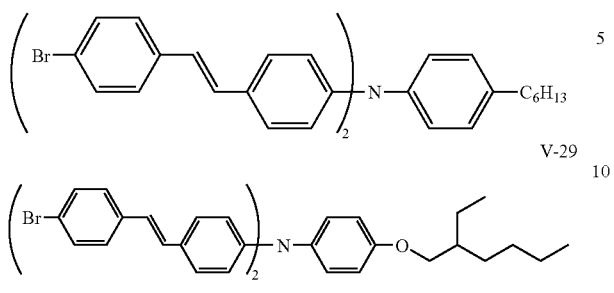
Next, preferred specific examples of diphosphonate ester compound expressed by General Formula (VI) are shown below.
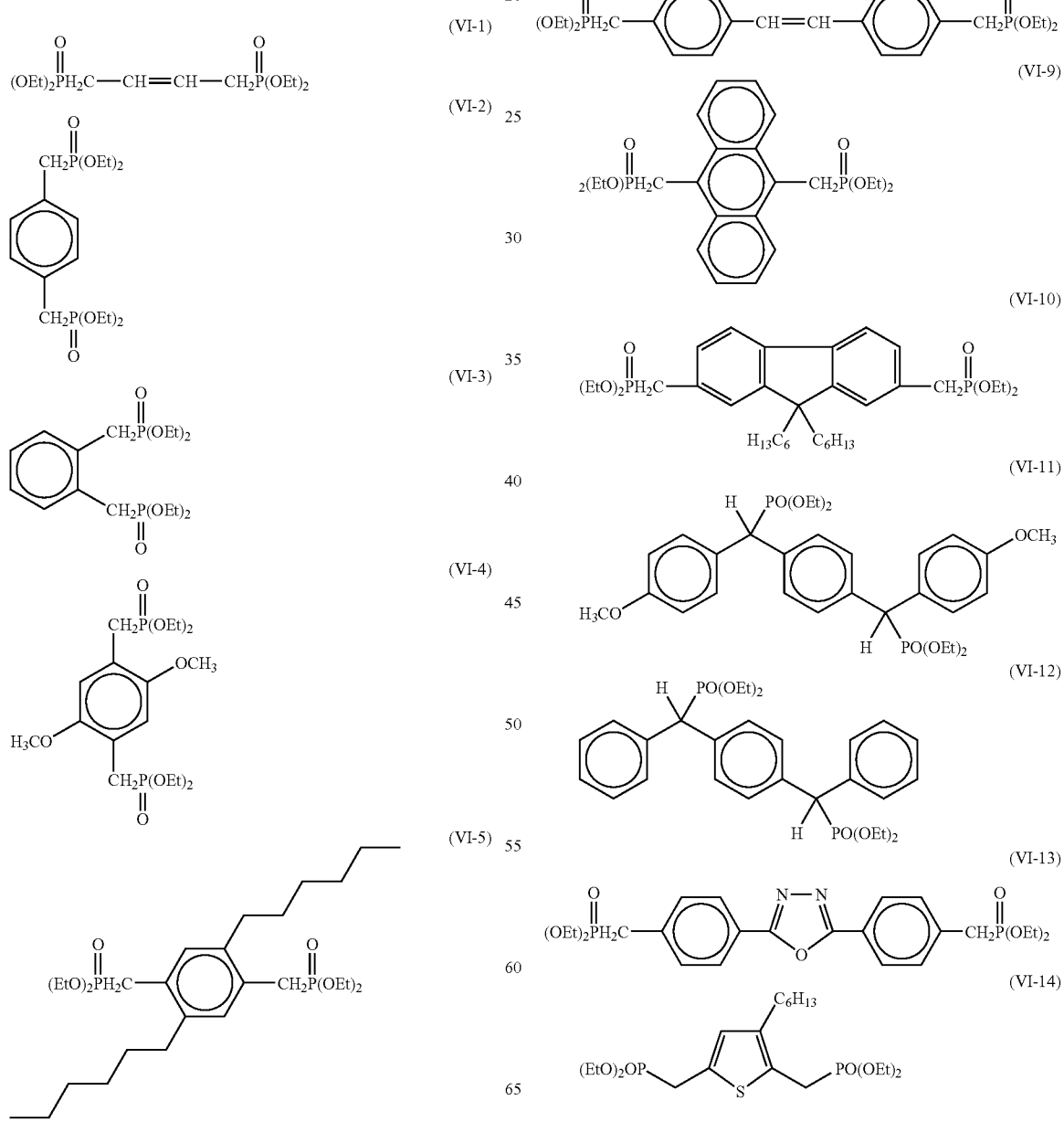

In above formulae, Et represents an ethyl group.

It is preferable for a compound to have a substituted or unsubstituted alkyl group, alkoxy group or alkylthio group in terms of higher solubility. If the carbon number of these substituted groups increase, so does the solubility. It is therefore preferable to select substituted groups that are capable of obtaining desired properties within the range in which solubility can be maintained. Examples of such substituted groups include alkyl group, alkoxy group and alkythio group having carbon number 1 to 25. These substituted groups may be used in combinations of heterogeneous or homogeneous groups.

The solubility of π-conjugated polymers of the present invention in a solvent is improved by having alkyl group, alkoxy group or alkylthio group. It is important for the π-conjugated polymers to improve its solubility in a solvent because it allows wider production tolerance range for wet layer forming during production of various elements. For example, it is possible to broaden alternatives of coating solvent, temperature range during solution preparation and temperature and pressure range during solution drying by improved solubility and resultant layer will be high in purity, uniformity and quality because of high processibility.

EXAMPLES

Herein below, with referring to Examples and Comparative Examples, the invention is explained in detail and the following Examples and Comparative Examples should not be construed as limiting the scope of this invention.

First, Synthetic Examples of a raw-material monomer, dialdehyde compounds will be described.

Synthetic Example 1

First, 1.56 g of 4-formylphenyl acetylene (based on W. B. Austin et al., J. Org. Chem., 46 2280(1981)), 1.21 g of 2,5-dibromothiophene expressed by V-12 in the above specific examples for dihalogen compound, 84 mg of bis(triphenylphosphine)palladium chloride and 46 mg of copper iodide were mixed with 60 ml of THF in an argon airflow and 40 ml of 0.5M ammonium water solution was added. After mixing at 60° C. for 5 hours, it was cooled to a room temperature and the content was poured into water. Next, ethyl acetate was added; an organic layer was separated after insoluble matter was removed by filtration and the solvent was distilled away. This was then subjected to silica gel column chromatography using a solution with a volume ratio of toluene to ethyl acetate, 4:1 and recrystallized from mixed solution of toluene and ethyl acetate to obtain 1.12 g of dialdehyde in form of yellow-colored leaf-like crystal expressed by the following Structural Formula.

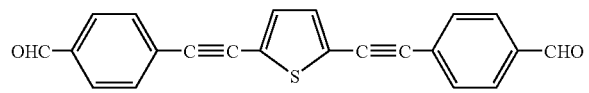

The analytical values of the obtained compound are as follow.

Melting point: 179.5° C. to 180.5° C.

Element analytical values (%): observed value (calculated value)

C: 78.16 (77.63)

H: 3.33 (3.55)

S: 9.10 (9.42)

The infrared absorption spectrum (KBr method) is shown in FIG. 1.

Carbon-carbon triple bond stretch: 2,197 cm$^{-1}$

CO (aldehyde) stretch: 1,702 cm$^{-1}$

Synthetic Example 2

First, 1.25 g of 4-formyl phenyl acetylene, 1.58 g of 2,5-dibromo-3,4-diphenylthiophene expressed by V-13 in the above specific examples for dihalogen compound, 166 mg of palladium chloride, 0.33 g of triphenylphosphine and 26 mg of copper acetate were heat-refluxed with 11 ml of THF and 22 ml of triethylamine for 8 hours in nitrogen airflow. This was then cooled to a room temperature and the solvent was distilled away after insoluble matter was removed by filtration. This was dissolved in toluene, washed with water, dried with magnesium sulfate and the solvent was distilled away. This was then subjected to silica gel column chromatography using a solution with a volume ratio of toluene to ethyl acetate, 4:1, recrystallized from the mixed solution of toluene and ethanol to obtain 1.17 g of dialdehyde in form of yellow-colored leaf-like crystal expressed by the following Structural Formula.

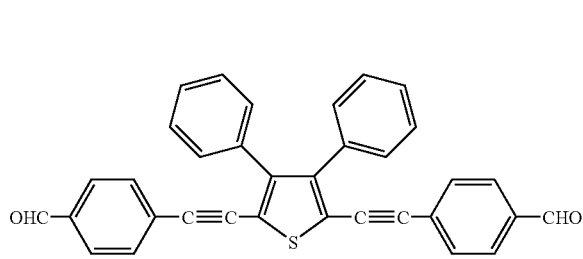

The analytical values of the obtained compound are as follow.

Melting point: 218.0° C. to 220.0° C.

Element analytical values (%): observed value (calculated value)

C: 83.11 (82.90)

H: 3.95 (4.09)

S: 6.35 (6.51)

Figure 2:
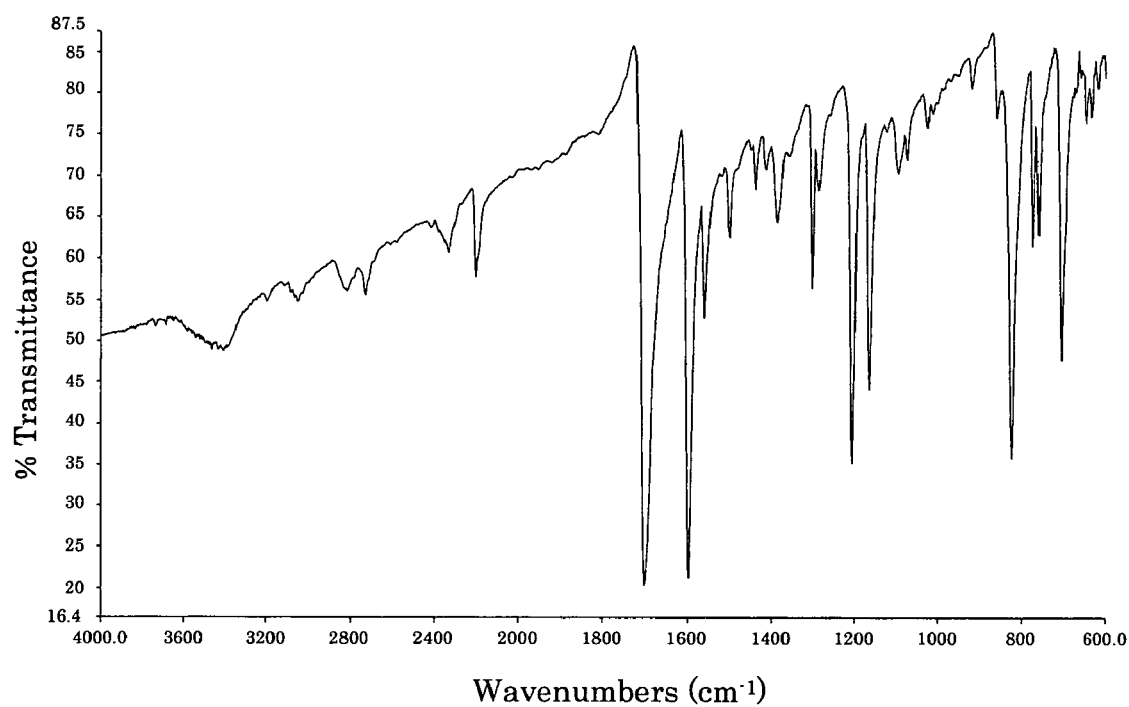
FIG. 2 is a view showing an infrared absorption spectrum (KBr method) of a dialdehyde compound obtained in Synthetic Example 2.

The infrared absorption spectrum (KBr method) is shown in FIG. 2.

Carbon-carbon triple bond stretch: 2,202 cm$^{-1}$

CO (aldehyde) stretch: 1,701 cm$^{-1}$

Synthetic Example 3

First, 1.72 g of 4-formyl phenyl acetylene, 2.50 g of 4,4'-dibromo-4''-methyltriphenylamine expressed by V-22 in the above specific examples for dihalogen compound, 250 mg of palladium chloride, 0.50 g of triphenylphosphine and 40 mg of copper acetate were heat-refluxed with 18 ml of THF and 34 ml of triethylamine for 11 hours in nitrogen airflow. This was then cooled to a room temperature and the solvent was distilled away after insoluble matter was removed by filtration. This was dissolved in toluene, washed with water, dried with magnesium sulfate and the solvent was distilled away. This was then subjected to silica gel column chromatography using a toluene solution and recrystallized from the mixed solution of toluene and ethanol to obtain 0.70 g of dialdehyde in form of orange-colored capillary crystal expressed by the following Structural Formula.

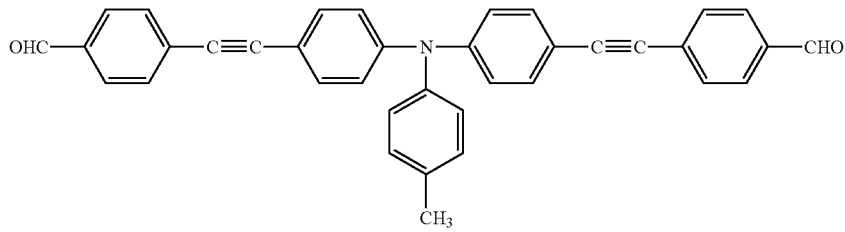

Figure 3:
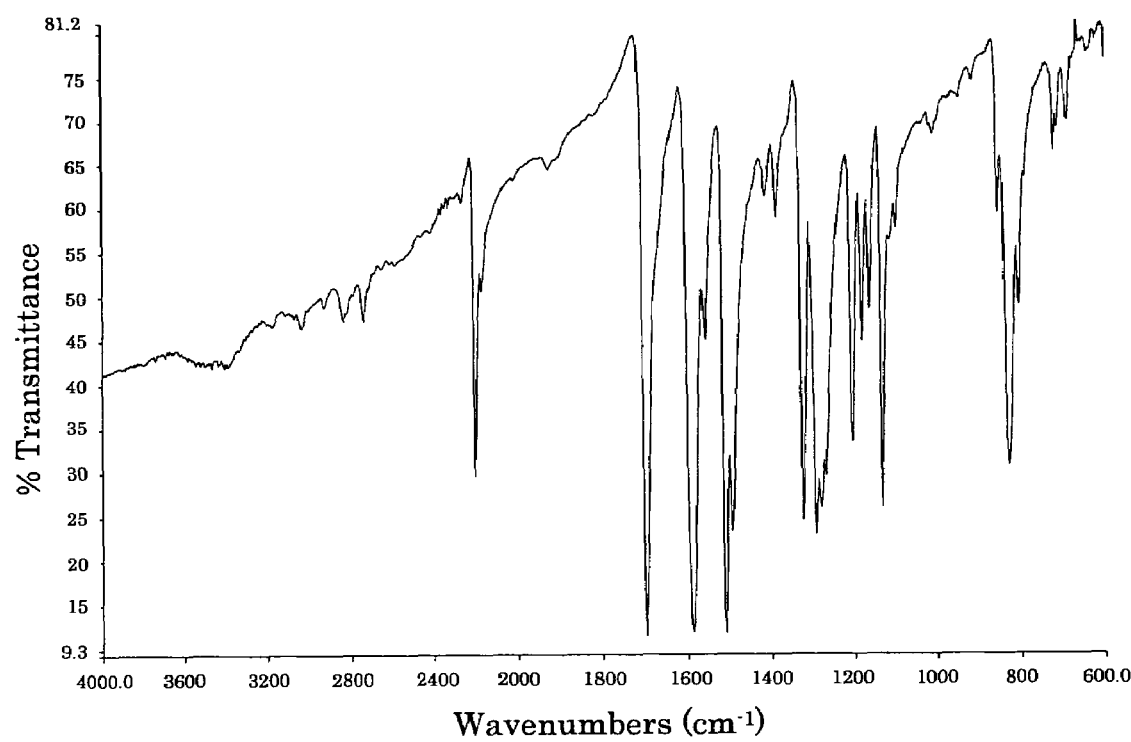
FIG. 3 is a view showing an infrared absorption spectrum (KBr method) of a dialdehyde compound obtained in Synthetic Example 3.

The analytical values of the obtained compound are as follow.
Melting point: 186.0° C. to 187.0° C.
Element analytical values (%): observed value (calculated value)
C: 86.01 (86.19)
H: 4.69 (4.89)
N: 2.77 (2.72)
The infrared absorption spectrum (KBr method) is shown in FIG. 3.
Carbon-carbon triple bond stretch: 2,204 cm$^{-1}$
CO (aldehyde) stretch: 1,698 cm$^{-1}$ Synthetic Example 4

First, 2.29 g of 4-formyl phenyl acetylene, 5.0 g of 4,4'-diiodo-4"-(2-ethylhexyloxy)triphenylamine expressed by V-27 in the above specific examples for dihalogen compound, 332 mg of palladium chloride, 0.66 g of triphenylphosphine and 52 mg of copper acetate were heat-refluxed with 22 ml of THF and 44 ml of triethylamine for 9 hours in nitrogen airflow. This was then cooled to a room temperature and the solvent was distilled away after insoluble matter was removed by filtration. This was dissolved in ethyl acetate, washed with water, dried with magnesium sulfate and the solvent was distilled away. This was subjected to silica gel column chromatography using a solution with a volume ratio of ethyl acetate to hexane, 1:4 to obtain 3.53 g of yellow glassy dialdehyde expressed by the following Structural Formula.

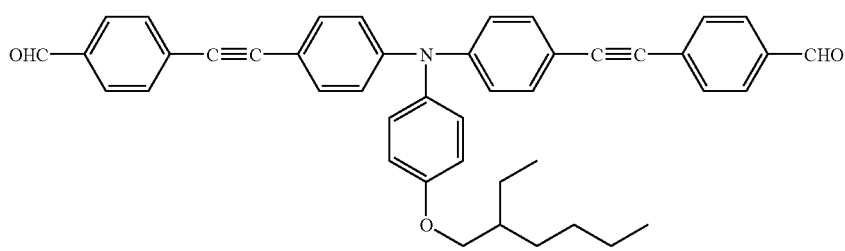

Figure 4:
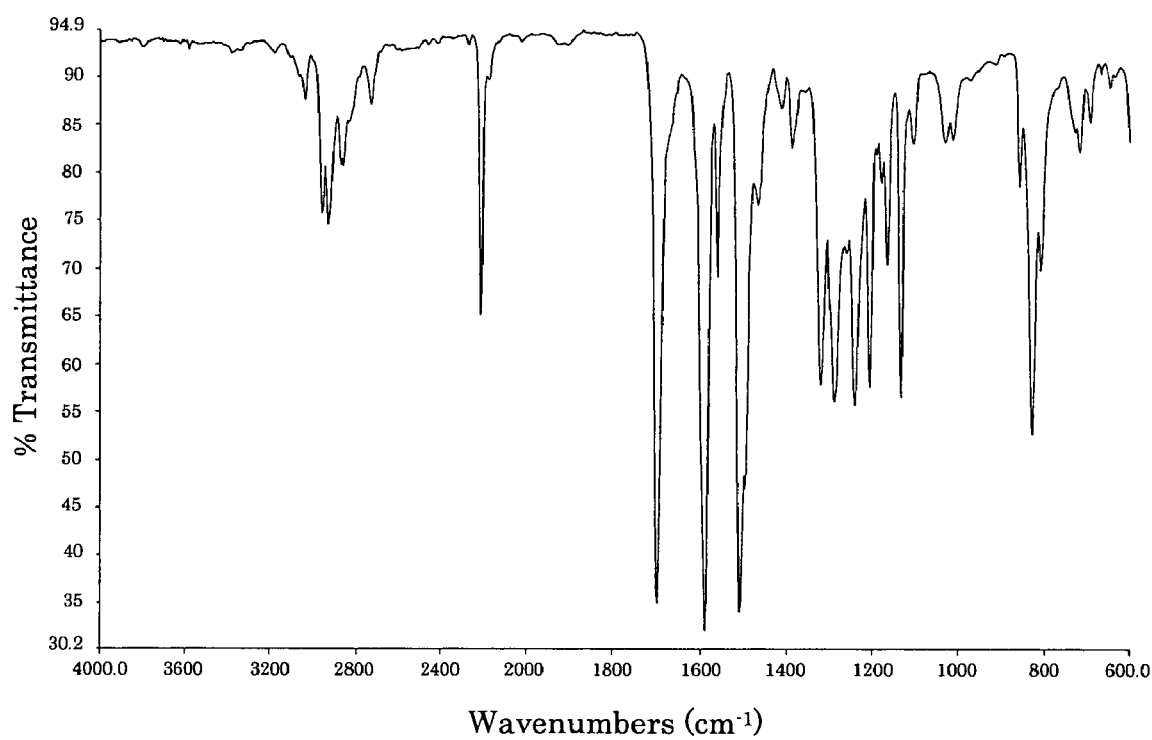
FIG. 4 is a view showing an infrared absorption spectrum (KBr method) of a dialdehyde compound obtained in Synthetic Example 4.

The analytical values of the obtained compound are as follow.
Element analytical values (%): observed value (calculated value)
C: 84.18 (83.91)
H: 6.01 (6.24)
N: 2.11 (2.22)
The infrared absorption spectrum (KBr method) is shown in FIG. 4.
Carbon-carbon triple bond stretch: 2,210 cm$^{-1}$
CO (aldehyde) stretch: 1,699 cm$^{-1}$ Example 1

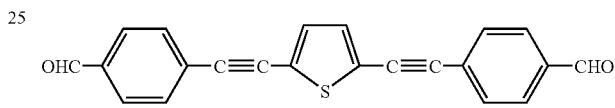

First, 0.68 g (2.0 mmol) of dialdehyde expressed by the above Structural Formula obtained in Synthetic Example 1, 1.13 g (2.0 mmol) of diphosphonate expressed by VI-6 in the above specific examples for diphosphonate ester compound and 8.0 mg of benzaldehyde were dissolved in 50 ml of N,N,-dimethyl formamide into which 6.0 ml (6.0 mmol) of 1.0 mol dm$^{-3}$ tetrahydrofran solution of potassium t-butoxide was allowed to drip in nitrogen airflow for 30 minutes. After this was dripped and mixed for 2 hours at a room temperature, 10 mg of benzyl diethyl phosphonate was added and further mixed for 30 minutes. This was then neutralized with acetate and reactive content was allowed to drip into water to obtain an orange-colored polymer. The obtained polymer was refined by heat-refluxing in a mixed solution of methanol/water, followed by methanol and then acetone to obtain 0.89 g of an orange-colored polymer expressed by the following Structural Formula.

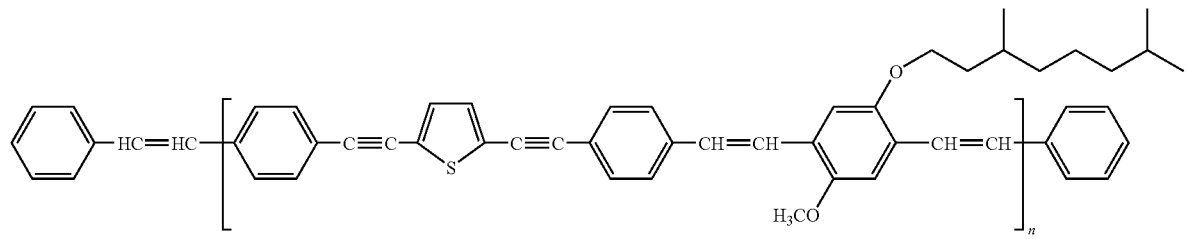

The analytical values of the obtained compound were as follow.

Element analytical values (%): observed value (calculated value)

C: 82.10 (82.50)
H: 6.60 (6.77)
S: 5.10 (5.37)

Figure 5:
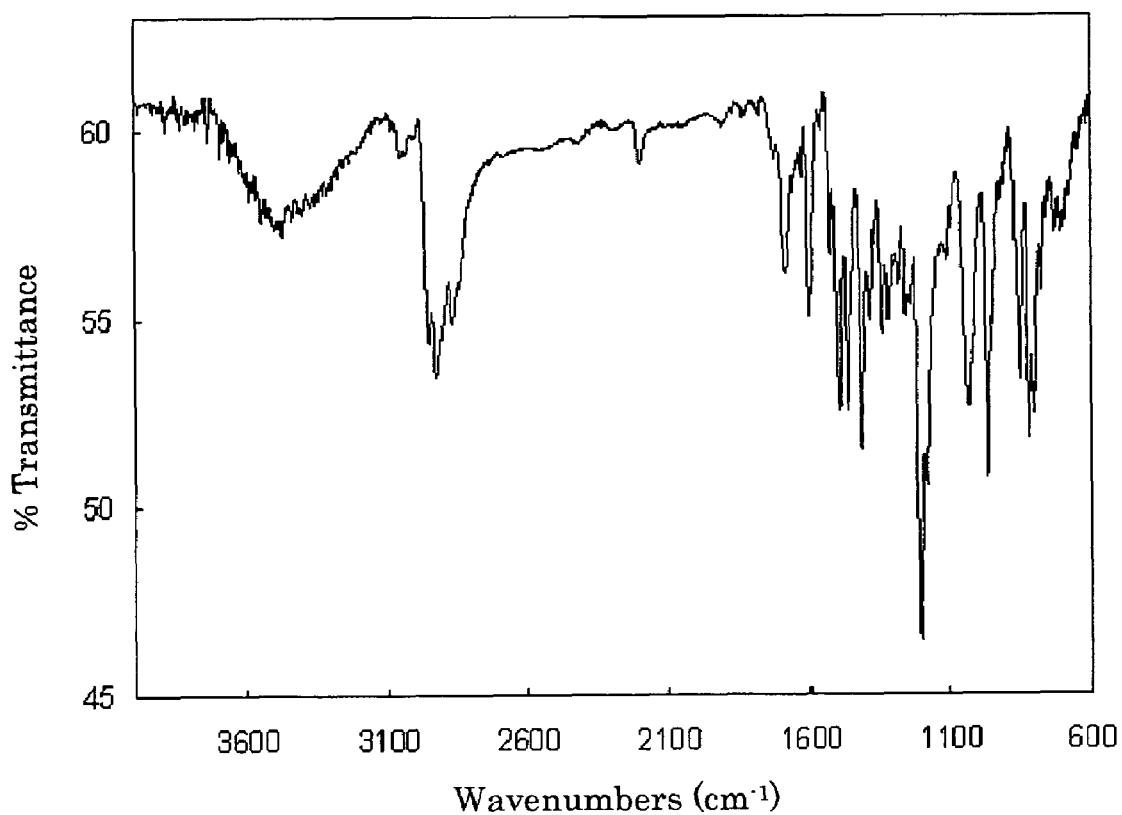
FIG. 5 is a view showing an infrared absorption spectrum of a π-conjugated polymer obtained in Example 1.

The infrared absorption spectrum (KBr method) is shown in FIG. 5.

vcc triple bond: 2,193 cm$^{-1}$
δt-CH=CH: 965 cm$^{-1}$
vCOC: 1,201 cm$^{-1}$, 1,030 cm$^{-1}$ Polystyrene equivalent molecular weight obtained by means of gel permeation chromatography Number average molecular weight and weight average molecular weight were impossible to obtain because the obtained polymer was insoluble in tetrahydrofran, a solution for molecular weight measurement.

Example 2

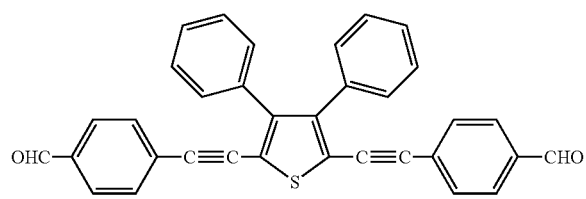

First, 0.985 g (2.0 mmol) of dialdehyde expressed by the above Structural Formula obtained in Synthetic Example 2, 1,130 g (2.0 mmol) of diphosphonate expressed by VI-6 in the above specific examples for diphosphonate ester compound and 8.0 mg of benzaldehyde were dissolved in 70 ml of tetrahydrofran into which 6.0 ml (6.0 mmol) of 1.0 mol dm$^{-3}$ tetrahydrofran solution of potassium t-butoxide was allowed to drip in nitrogen airflow for 30 minutes. After this was dripped and mixed for 2 hours at a room temperature, 10 mg of benzyl diethyl phosphonate was added and further mixed for 30 minutes. This was then neutralized with acetate and reactive content was allowed to drip into water to obtain an orange-colored polymer. The obtained polymer was refined by heat-refluxing in methanol to obtain 0.90 g of an orange-colored polymer expressed by the following Structural Formula.

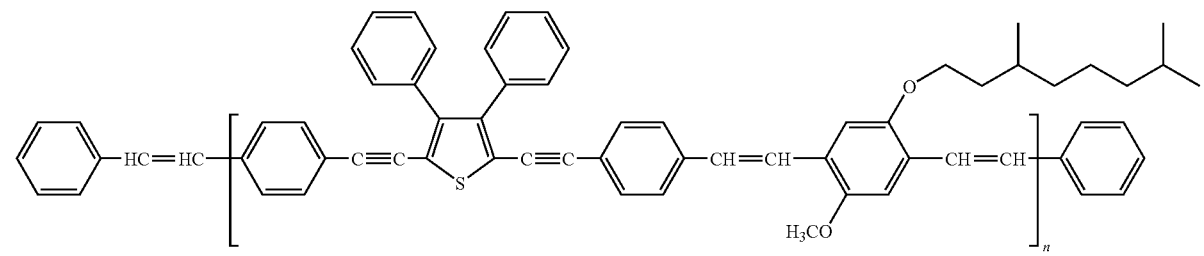

The analytical values of the obtained compound were as follow.

Element analytical values (%): observed value (calculated value)

C: 84.60 (84.98)
H: 6.34 (6.47)
S: 4.10 (4.28)

Figure 6:
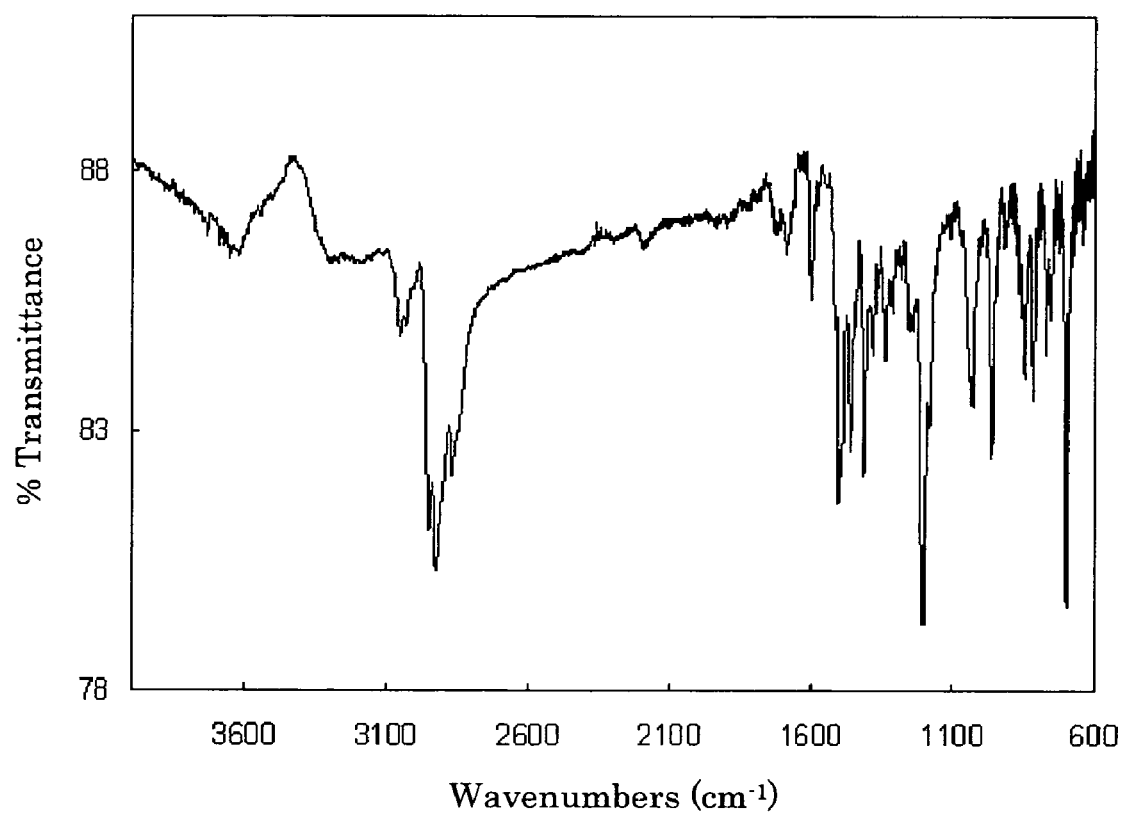
FIG. 6 is a view showing an infrared absorption spectrum of a π-conjugated polymer obtained in Example 2.

The infrared absorption spectrum (KBr method) is shown in FIG. 6.

vCC triple bond: 2,193 cm$^{-1}$
δt-CH=CH: 963 cm$^{-1}$
vCO: 1,203 cm$^{-1}$, 1,030 cm$^{-1}$ Polystyrene equivalent molecular weight obtained by means of gel permeation chromatography Number average molecular weight and weight average molecular weight were impossible to obtain because the obtained polymer was insoluble in tetrahydrofran, a solution for molecular weight measurement.

Example 3

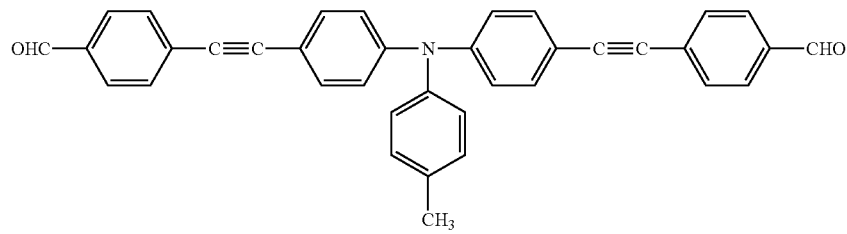

First, 0.773 g (1.5 mmol) of dialdehyde expressed by the above Structural Formula obtained in Synthetic Example 3, 0.847 g (1.5 mmol) of diphosphonate expressed by VI-6 in above specific examples for diphosphonate ester compound and 6.0 mg of benzaldehyde were dissolved in 40 ml of tetrahydrofran into which 4.5 ml (4.5 mmol) of 1.0 mol dm$^{-3}$ tetrahydrofran solution of potassium t-butoxide was allowed to drip in nitrogen airflow for 30 minutes. After this was dripped and mixed for 3 hours at a room temperature, 10 mg of benzyl diethyl phosphonate was added and further mixed for 30 minutes. This was then neutralized with acetate and reactive content was allowed to drip into water to obtain a yellow-colored polymer. The obtained polymer was refined by reprecipitation with tetrahydrofran/water, refined twice by reprecipitation with tetrahydrofran/methanol and refined by heat-refluxing in methanol to obtain 0.87 g of a yellow-colored polymer expressed by the following Structural Formula.

The analytical values of the obtained compound were as follow.

Element analytical values (%): observed value (calculated value)

C: 86.81 (87.11)
H: 6.94 (6.93)
N: 1.81 (1.81)

Figure 7:
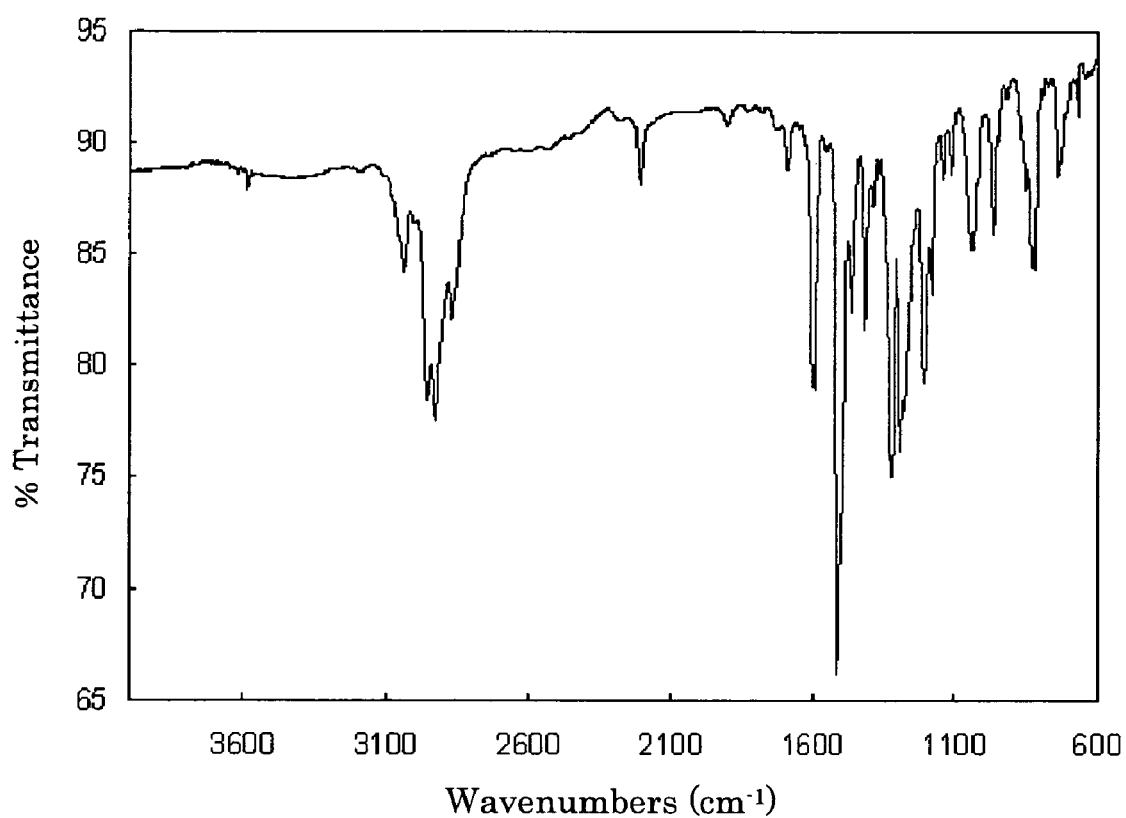
FIG. 7 is a view showing an infrared absorption spectrum of a π-conjugated polymer obtained in Example 3.

The infrared absorption spectrum (NaCl-cast layer) is shown in FIG. 7.

vCC triple bond: 2,210 cm$^{-1}$
δt-CH=CH: 965 cm$^{-1}$
vCOC: 1,206 cm$^{-1}$, 1,037 cm$^{-1}$ Polystyrene equivalent molecular weight obtained by means of gel permeation chromatography Number average molecular weight: 9,535
Weight average molecular weight: 37,949

Example 4

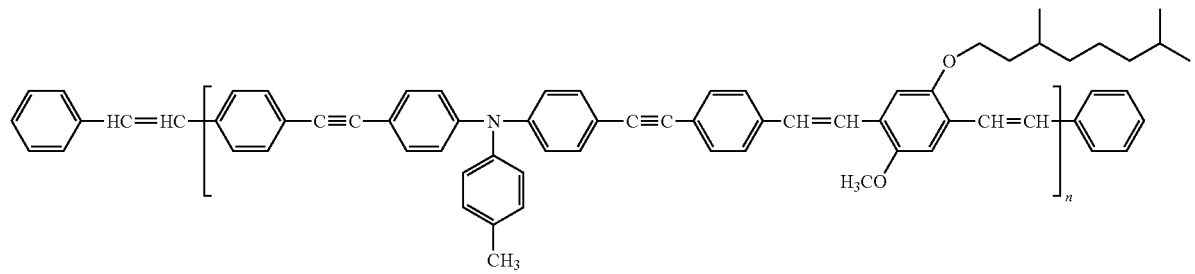

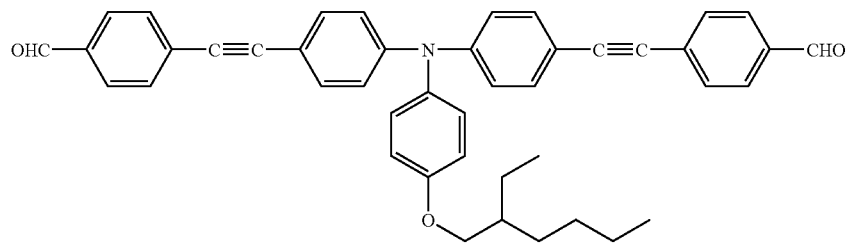

First, 0.945 g (1.5 mmol) of dialdehyde expressed by the above Structural Formula obtained in Synthetic Example 4, 0.847 g (1.5 mmol) of diphosphonate expressed by VI-6 in the above specific examples for diphosphonate ester compound and 4.3 mg of benzaldehyde were dissolved in 50 ml of tetrahydrofran into which 4.5 ml (4.5 mmol) of 1.0 mol dm$^{-3}$ tetrahydrofran solution of potassium t-butoxide was allowed to drip in nitrogen airflow for 30 minutes. After this was dripped and mixed for 3 hours at a room temperature, 10 mg of benzyl diethyl phosphonate was added and further mixed for 30 minutes. This was then neutralized with acetate and reactive content was allowed to drip into water to obtain a yellow-colored polymer. The obtained polymer was refined by reprecipitation with tetrahydrofran/water and refined twice by reprecipitation with tetrahydrofran/methanol. This was then dissolved in methylene chloride and washed with deionized water until the conductivity of wash fluid becomes equivalent to that of deionized water. The methylene chloride solution was allowed to drip into methanol to obtain 0.95 g of a yellow-colored polymer expressed by the following Structural Formula.

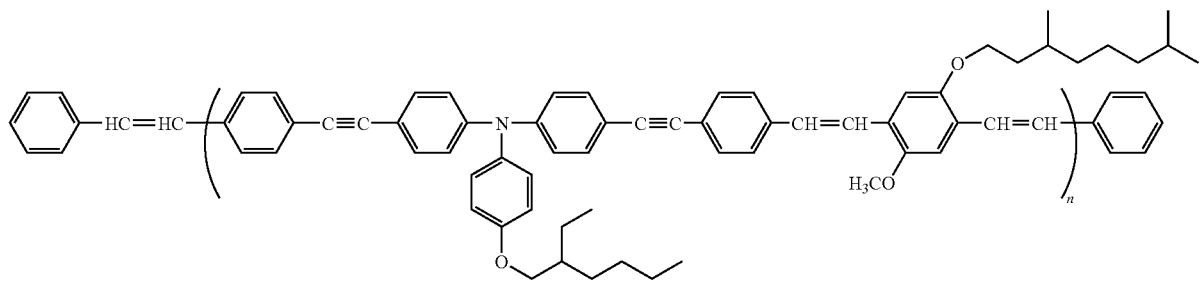

The analytical values of the obtained compound were as follow.

Element analytical values (%): observed value (calculated value)

C: 85.32 (85.37)

H: 7.62 (7.64)

N: 1.52 (1.58)

Figure 8:
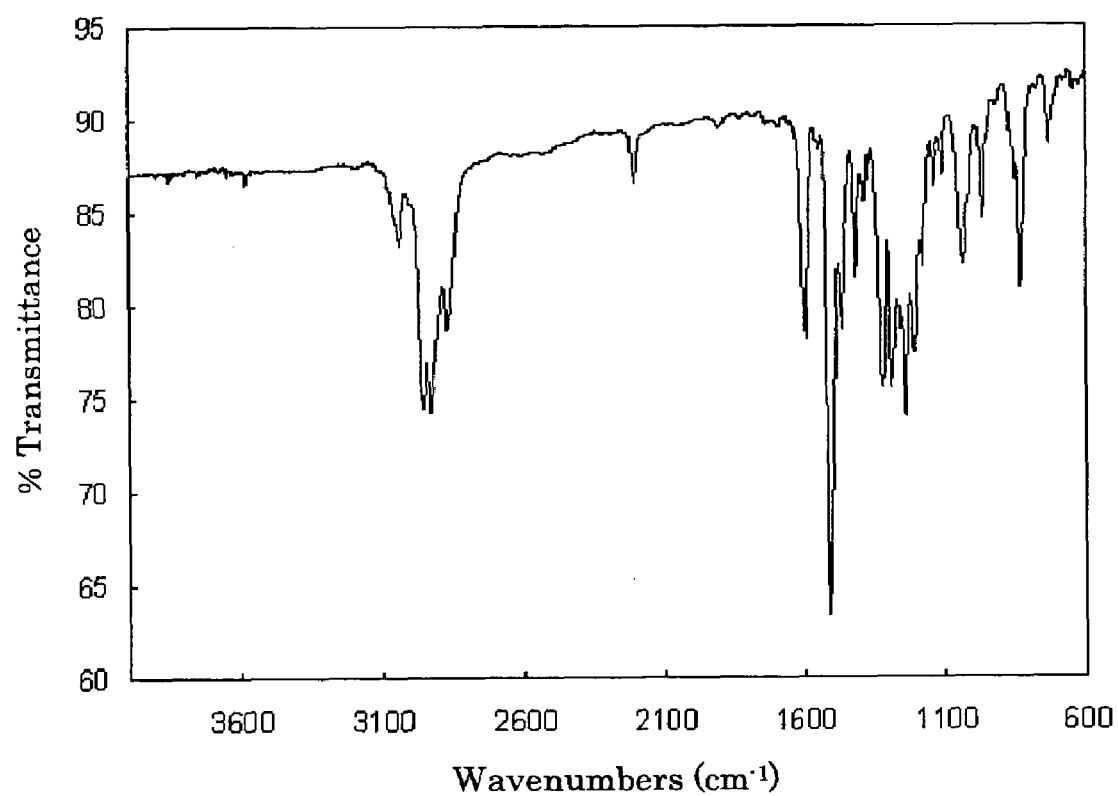
FIG. 8 is a view showing an infrared absorption spectrum of a π-conjugated polymer obtained in Example 4.

The infrared absorption spectrum (NaCl-cast layer) is shown in FIG. 8.

vCC triple bond: 2,209 cm$^{-1}$

δt-CH=CH: 965 cm$^{-1}$ vCOC: 1,240 cm$^{-1}$, 1,034 cm$^{-1}$

Polystyrene equivalent molecular weight obtained by means of gel permeation chromatography Number average molecular weight: 19,362

Weight average molecular weight: 55,814

Example 5

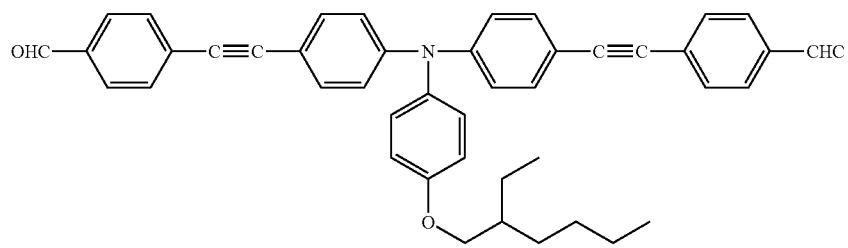

First, 1.26 g (2.0 mmol) of dialdehyde expressed by the above Structural Formula, 1.09 g (2.0 mmol) of diphosphonate expressed by VI-5 in the above specific examples for diphosphonate ester compound and 9.7 mg of p-tert-butylbenzaldehyde were dissolved in 60 ml of tetrahydrofran into which 6.0 ml (6.0 mmol) of 1.0 mol dm$^{-3}$ tetrahydrofran solution of potassium t-butoxide was allowed to drip in nitrogen airflow for 30 minutes. After this was dripped and mixed for 3 hours at a room temperature, 10 mg of benzyl diethyl phosphonate was added and further mixed for 30 minutes. This was then neutralized with acetate and reactive content was allowed to drip into water to obtain a yellow-colored polymer. This was then refined by reprecipitation with tetrahydrofran/water and refined twice by reprecipitation with tetrahydrofran/methanol. The obtained polymer was dissolved in methylene chloride and washed with deionized water until the conductivity of wash fluid becomes equivalent to that of deionized water. The methylene chloride solution was allowed to drip into methanol to obtain 1.50 g of a yellow-colored polymer expressed by the following Structural Formula.

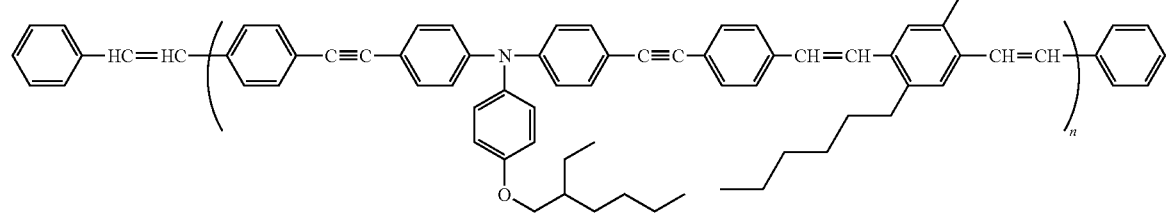

The analytical values of the obtained compound were as follow.

Element analytical values (%): observed value (calculated value)

C: 88.32 (88.52)
H: 8.01 (8.03)
N: 1.61 (1.58)

Figure 9:
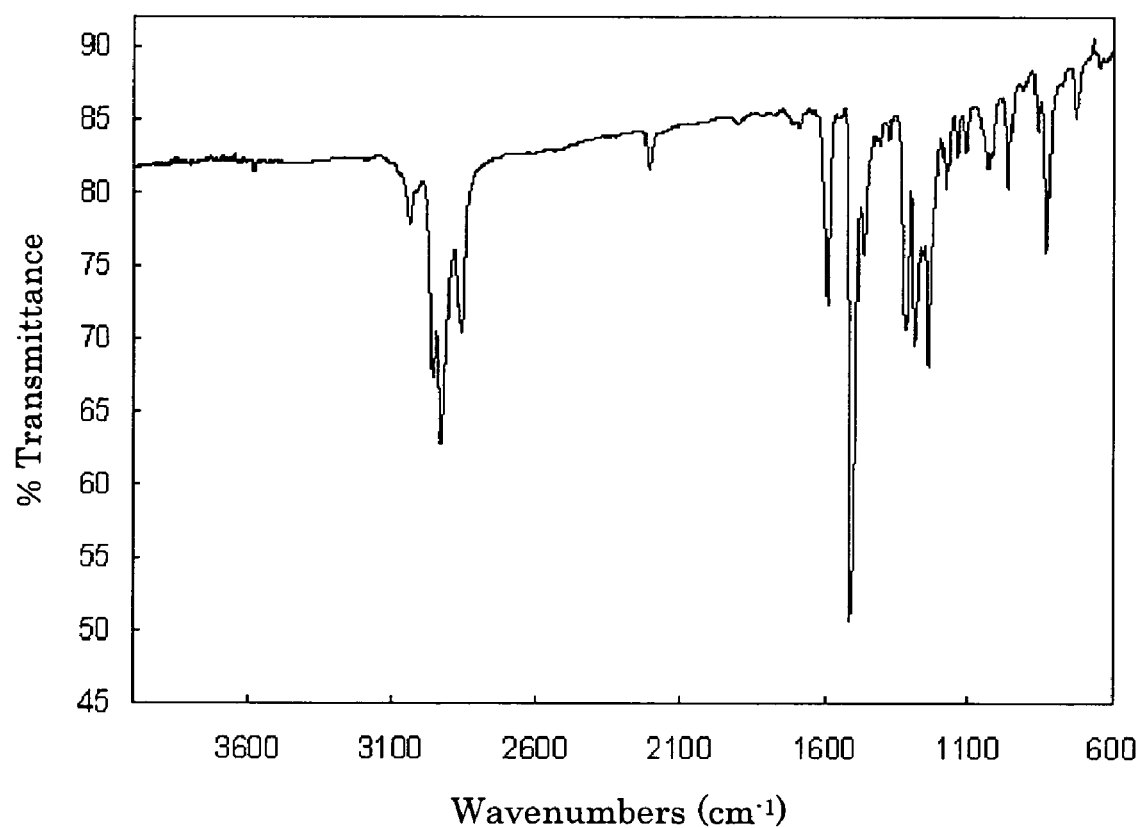
FIG. 9 is a view showing an infrared absorption spectrum of a π-conjugated polymer obtained in Example 5.

The infrared absorption spectrum (NaCl-cast layer) is shown in FIG. 9.

vCC triple bond: 2,209 cm$^{-1}$
δt-CH=CH: 961 cm$^{-1}$
vCOC: 1,240 cm$^{-1}$, 1,030 cm$^{-1}$ Polystyrene equivalent molecular weight obtained by means of gel permeation chromatography Number average molecular weight: 10,612
Weight average molecular weight: 25,754

What is claimed is:

1. A π-conjugated polymer comprising:
a repeating unit,
wherein the repeating unit is expressed by the following General Formula (I):

General Formula (I)

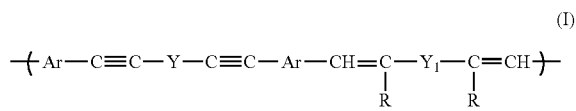

where, in the General Formula (I), Y represents a divalent group selected from one of a substituted or unsubstituted triphenylamine structure and a substituted or unsubstituted thiophene, Ar represents a divalent group selected from one of a substituted or unsubstituted aromatic hydrocarbon and a substituted or unsubstituted aromatic heterocyclic ring, $Y_1$ represents one of a substituted or unsubstituted unsaturated aliphatic hydrocarbon, a substituted or unsubstituted aromatic hydrocarbon and a substituted or unsubstituted divalent group of aromatic heterocyclic ring and R represents one of a hydrogen atom, a substituted or unsubstituted alkyl group and a substituted or unsubstituted aromatic hydrocarbon group.

2. The π-conjugated polymer according to claim 1, wherein the π-conjugated polymer comprises a repeating unit expressed by the following General Formula (II):

General Formula (II)

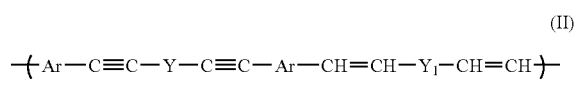

where, in the General Formula (II), Y represents a divalent group selected from one of a substituted or unsubstituted triphenylamine structure and a substituted or unsubstituted thiophene, Ar represents a divalent group selected from one of a substituted or unsubstituted aromatic hydrocarbon and a substituted or unsubstituted aromatic heterocyclic ring and $Y_1$ represents one of a substituted or unsubstituted unsaturated aliphatic hydrocarbon, a substituted or unsubstituted aromatic hydrocarbon and a substituted or unsubstituted divalent group of aromatic heterocyclic ring.

3. The π-conjugated polymer according to claim 2, wherein the π-conjugated polymer comprises a repeating unit expressed by the following General Formula (III):

General Formula (III)

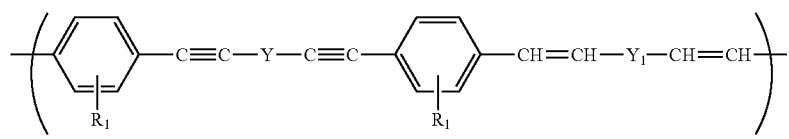

where, in the General Formula (III), Y represents a divalent group selected from one of a substituted or unsubstituted triphenylamine structure and a substituted or unsubstituted thiophene, $Y_1$ represents one of a substituted or unsubstituted unsaturated aliphatic hydrocarbon, a substituted or unsubstituted aromatic hydrocarbon and a substituted or unsubstituted divalent group of aromatic heterocyclic ring and $R_1$ represents one of a hydrogen atom, a substituted or unsubstituted alkyl group and a substituted or unsubstituted alkoxy group.

4. The π-conjugated polymer according to claim 1, wherein the π-conjugated polymer comprises a repeating unit expressed by the following General Formula (IV):

General Formula (IV)

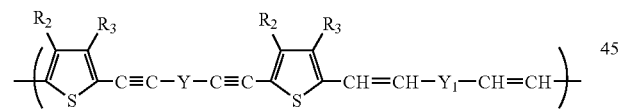

where, in the General Formula (IV), Y represents a divalent group selected from one of a substituted or unsubstituted triphenylamine structure and a substituted or unsubstituted thiophene and $Y_1$ represents one of a substituted or unsubstituted unsaturated aliphatic hydrocarbon, a substituted or unsubstituted aromatic hydrocarbon and a substituted or unsubstituted divalent group of aromatic heterocyclic ring; wherein each $R_2$ and $R_3$ represents one of a hydrogen atom and a substituted or unsubstituted alkyl group and they may be homogeneous or heterogeneous to each other.

5. The π-conjugated polymer according to claim 1, wherein the polystyrene equivalent number average molecular weight of the π-conjugated polymer is 1,000 to 1,000,000.

6. The π-conjugated polymer according to claim 1, wherein the π-conjugated polymer is utilized in any one of photoelectric conversion elements, FET elements and light-emitting elements.

7. The π-conjugated polymer according to claim 1, wherein Y is a group represented by one of the following structures:

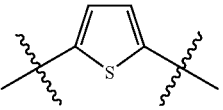
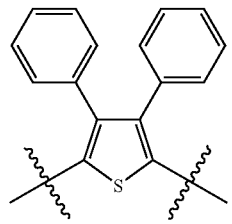

-continued

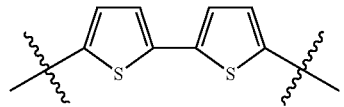
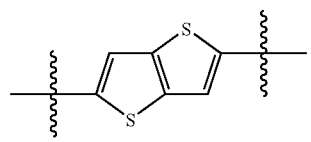
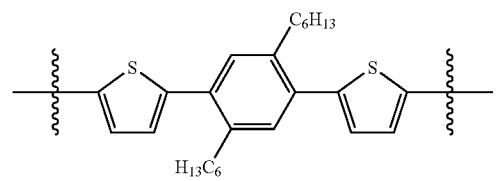
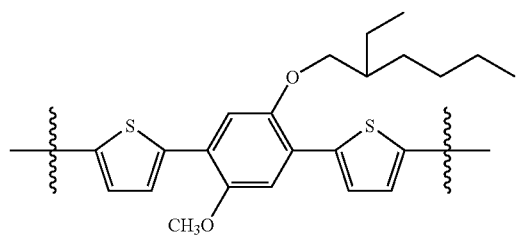
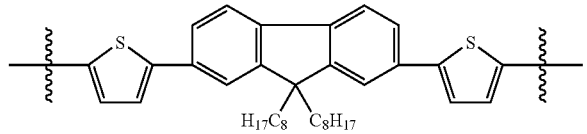

-continued
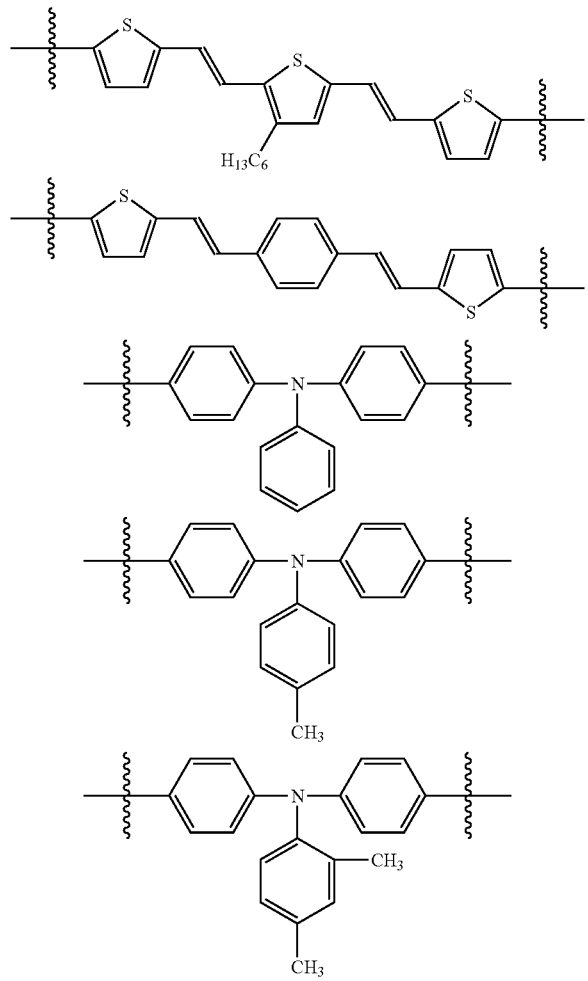
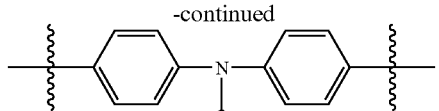
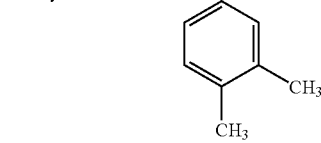
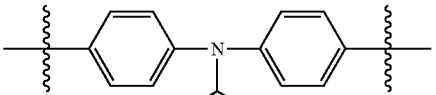
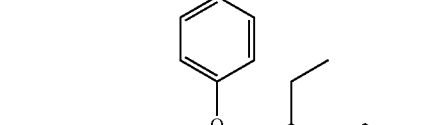
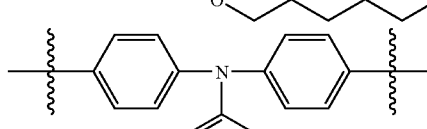
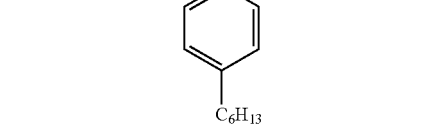
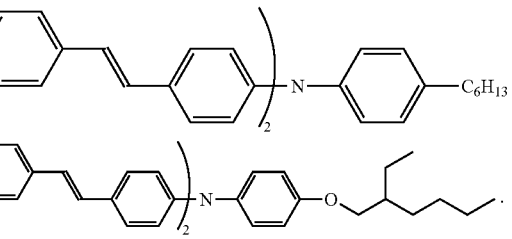
* * * * *